(12) United States Patent
Krabbenhoeft et al.

(10) Patent No.: US 10,404,896 B2
(45) Date of Patent: Sep. 3, 2019

(54) METHOD FOR PRESERVING THE BLACK COMPOSITION OF OBJECTS

(71) Applicant: HEIDELBERGER DRUCKMASCHINEN AG, Heidelberg (DE)

(72) Inventors: Uwe-Jens Krabbenhoeft, Quarnbek (DE); Bernd Stritzel, Goosefeld (DE); Peter Weinholz, Tuettendorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/926,003

(22) Filed: Mar. 20, 2018

(65) Prior Publication Data

US 2018/0278805 A1    Sep. 27, 2018

(30) Foreign Application Priority Data

Mar. 21, 2017   (DE) .................... 10 2017 204 684

(51) Int. Cl.
*H04N 1/60*     (2006.01)
*G06T 7/00*     (2017.01)

(52) U.S. Cl.
CPC ......... *H04N 1/6022* (2013.01); *G06T 7/0002* (2013.01); *H04N 1/603* (2013.01); *H04N 1/6008* (2013.01); *G06T 2207/10024* (2013.01); *G06T 2207/20048* (2013.01)

(58) Field of Classification Search
CPC .................................................. H04N 1/6022
USPC ....................................................... 358/1.9
See application file for complete search history.

(56) References Cited

U.S. PATENT DOCUMENTS

| 5,189,521 A | 2/1993 | Ohtsubo et al. |
| 5,475,800 A | 12/1995 | Vaughn et al. |
| 5,732,153 A | 3/1998 | Ohsawa |
| 5,771,338 A * | 6/1998 | Nhu ............ H04N 1/1911 358/1.16 |
| 2004/0196475 A1* | 10/2004 | Zeng ............ H04N 1/6022 358/1.9 |

(Continued)

FOREIGN PATENT DOCUMENTS

| DE | H03286677 A | 12/1991 |
| DE | 69121640 T2 | 1/1997 |
| DE | 69225377 T2 | 9/1998 |

*Primary Examiner* — Jacky X Zheng
(74) *Attorney, Agent, or Firm* — Laurence A. Greenberg; Werner H. Stemer; Ralph E. Locher

(57) ABSTRACT

A method for preserving the black composition of at least one object positioned to overprint a special color in a print image for preprint color management of a printing operation using a computer, includes transforming the special color and the object into a combination of process colors of the printing operation during the color management process and then using this combination of process colors to generate the print image in a printing machine. The color transformation into the process colors of the printing operation is achieved in two stages. In a first stage, the color transformation into the process colors is carried out while keeping the special colors, then checking if the object is overprinted onto the special color, then removing the black proportion of the object and then in a second stage, transforming the special color into the process colors and subsequently maximizing the black proportion of the object.

9 Claims, 3 Drawing Sheets

(56) References Cited

U.S. PATENT DOCUMENTS

2005/0140997 A1    6/2005  Shirasawa
2007/0229862 A1*  10/2007  Derhak ................ H04N 1/6022
                                                        358/1.9

* cited by examiner

METHOD FOR PRESERVING THE BLACK COMPOSITION OF OBJECTS

CROSS-REFERENCE TO RELATED APPLICATION

This application claims the benefit, under 35 U.S.C. § 119, of German Patent Application DE 10 2017 204 684.8, filed Mar. 21, 2017; the prior application is herewith incorporated by reference in its entirety.

BACKGROUND OF THE INVENTION

Field of the Invention

The invention relates to a method for preserving the black composition of objects that are placed as an overprint on an additional color in a print image.

The technical field of the invention is the field of digital printing.

In the printing industry, a multicolor print is implemented by printing multiple print colors, known as color separations, on top of one another. That applies to classical lithographic offset printing as well as to digital inkjet printing. That means that every color separation corresponds to one print color that is used in the printing operation. Thus, in a CMYK printing operation, i.e. in four-color printing, four color separations are created. Each one of those color separations contains the respective proportion of the corresponding color in the resultant print image. In addition to CMYK, further print colors, referred to as additional colors, are used. Those additional colors become necessary if the resultant print is to attain color values that may not be attained in the classical CMYK process color space. In the printing operation, those additional colors are then added to the resultant print as additional color separations. It is likewise possible to replace one of the four CMYK default colors by an additional color in a four-color printing operation.

The use of the additional color often becomes necessary if special color values are to be attained in the image to be printed. Such special color values are, for instance, color values form the Pantone Ink color catalog. Those are for instance elements of specific company logos that are intended to ensure a high recognition value due to the special color value. The special colors having that special color value are characterized by a specific LAB value in the color chart. In the course of the printing operation, that special color then has to be converted to the process color space. That means that a combination of the available CMYK process colors plus potentially necessary additional colors that allow the color value of the special color to be reproduced as accurately as possible needs to be determined. In general, that is achieved by a color space transformation implemented at the preprint stage of the printing operation. In that process, an input profile is used to convert the print image data, which are available in digital form from the print job, for instance in a RGB color space, into the so-called XYZ color space. The LAB color space is a special embodiment of the XYZ color space. In the XYZ or LAB color space, a standardized color value reproduction of the print image to be attained is possible. In order to determine the corresponding process color combinations for a reproduction of the print image with maximum color fidelity, the corresponding color space transformation between the XYZ/LAB color space and the process color space (CMYK plus additional colors) needs to be implemented in a corresponding way. That is likewise true for the use of the corresponding special color mentioned above.

Now, if a black object is placed on a special color in the digital preprint print image to be produced, that process may cause problems. The black object may, for instance, be a bar code. The bar code is usually reproduced with a very high black value close to 100% of black because the bar code is formed of multiple thin black lines that need to have a high contrast relative to the immediate image environment to ensure proper data transmission. Now, if such a print image including a black object on a special color is transformed into the process color space (CMYK plus additional colors) using the color space transformation described above, the color combination of the process colors will not match the desired result.

In the original image, the black value of the black object is close to 100% and the remaining color values, which correspond to the special color, are accordingly 0. In the neighboring areas, which are not covered by the black object, the black value results from the special color that has been converted to the process color space. When combining the color values of the special color and the color value of black, the color transformation into the process color space will result in a black value of less than approximately 100% at the location of the black object.

In a normal print image, that usually does not present a problem because the color value at the location in question is still very dark. However, for some specific black objects such as bar codes, which need very fine, thin lines of high contrast, it may cause problems due to register effects or register errors. A black value of much less than 100% for such an object may no longer guarantee a proper reading of the bar code. In many cases, bar codes that have such a reduced black value may then no longer be read by machines.

The fundamental problem is that in accordance with the printing operation described above and involving the corresponding color space transformation, the resultant mixed color of black on a special color is determined in such a way that both black and the special color are transformed into the XYZ/LAB color space. Then the mixed color is determined in that color space. When the mixed color is subsequently transformed into the CMYK color space (plus potential additional colors), black no longer has the corresponding value of 100%.

The current state of the art only allows such a black composition of objects to be preserved if they exclusively interact with regular print colors and not with special colors. The only procedure heretofore known in the art that allows black objects to be overprinted onto special colors is to cut out the black objects in the special color in the process color space and then to apply the black object onto the unprinted cut-out region by using the black color separation. However, in that process, the smallest register inaccuracy between the black color separation and the other color separations that reproduce the special color would cause white gaps in the print. That means that even the slightest shift of the black color separation would cause a narrow region of the cut-out black object to remain unprinted and thus visible, for instance, on a white printing substrate, seriously affecting the print image.

SUMMARY OF THE INVENTION

It is accordingly an object of the invention to provide a method for preserving the black composition of objects, which overcomes the hereinafore-mentioned disadvantages of the heretofore-known methods of this general type and which provides a method for printing black image objects on special colors without any negative effects on the quality of the print.

With the foregoing and other objects in view there is provided, in accordance with the invention, a method for preserving the black composition of at least one object positioned to overprint a special color in a print image for use in preprint color management of a printing operation by using a computer, the special color and the at least one object being transformed into a combination of process colors of the printing operation in the course of the color management process and this combination of process colors then being used to generate the print image in a printing machine. According to the method, the color transformation into the process colors of the printing operation is achieved in two stages; in a first stage, the color transformation into the process colors is carried out while keeping the special colors, subsequently an evaluation is made to find out whether the at least one object is printed onto the special color, and the black proportion of the at least one object is removed, and in a second stage, the special color is transformed into the process colors and subsequently the black proportion of the at least one object is maximized.

The method of the invention contains three main steps. Instead of immediately carrying out a color space transformation of the black value plus special color into the XYZ/LAB color space, determining the mixed color in this color space, and transforming this mixed color to the process color space as it is done in the prior art, the method of the invention proposes as the next step after the transformation into the XYZ/LAB color space to implement a color transformation from the XYZ/LAB color space into the CMYK process color space (plus potential additional color) without transforming the region of the special colors. The result is an intermediate image in the CMYK process color space that additionally has the corresponding special color values in the original XYZ/LAB color space at the locations of the special color. Out of this intermediate image, all regions in which CMY=0 and K, i.e. black, and the special colors are >0, are then extracted on the computer. In a further step of the method, the black proportion for these regions of the object is removed and only the special color value remains. Then a color space transformation into the process color space with the CMYK process colors plus potential additional colors is carried out. In a last step, the black value in the resultant process color combination is maximized. It is important to note that this method is only implemented for those regions in which the black object is placed on top of the special color. In accordance with the invention, the regions that contain only special colors, i.e. the regions that are not covered by the black object, are transformed into the process color space by using a color space transformation process known in the art. Maximizing the black proportion in the regions where black is overprinted onto a special color as proposed by the invention thus ensures that the required maximum black value is present for sensitive black objects in the print image such as bar codes.

Advantageous and thus preferred further developments of the method will become apparent from the associated dependent claims and from the description together with the associated drawings.

Another preferred development in this context is that the final maximization of the black proportion of the at least one object is achieved by overwriting the black proportion that is created when the special color is transformed into the process colors with a maximum black value. The maximization of the black proportion may be achieved by overwriting the black proportion that has been created in the color transformation of the special color into the process colors with the corresponding maximum black value. In this case a certain color deviation of the resultant color value is tolerated because the black proportion has played a part in the actual calculation of the process color combination. However, this is tolerated for the reasons indicated above.

A further preferred development in this context is that the final maximization of the black proportion of the at least one object is achieved by adding a maximum black value and no black proportion is calculated in the color transformation of the special color into the process colors. Another way of maximizing the black value is to carry out the color space transformation of the special color into the process color space in the overprint region in such a way that no black proportion is calculated. Since the black proportion is maximized anyway, it is not necessary to calculate a black proportion for the special color itself. An advantage of this process is that it provides a more accurate color reproduction than a mere overwriting of the black proportion.

An added preferred development in this context is that the process colors of the printing operation that define the output color space of the printing operation include CMYK plus optionally at least one additional process color. The preferred output color space in this process is the CMYK color space. In addition, optionally at least one additional process color in the form of orange, green, or violet, for example, may optionally be used. This is necessary because CMYK process colors alone are often not enough to reproduce the color values of all possible special colors in a correspondingly color-true way.

An additional preferred development in this context is that the evaluation or check whether the at least one object is printed over the special color is done by examining the color values of the at least one object, the condition being that CMY is equal zero, K is at a maximum, and the special color needs to be greater than zero. The evaluation is implemented in such a way that after the first step, in which all color values of the print image except for the special colors are transformed to CMYK, the print image is checked for regions in which CMY=0, K>0, and a special color value >0.

Another preferred development in this context is that regions of the print image that have the special color and are not overprinted with the at least one object are converted into the process colors in the course of the second color transformation stage without any influence on the proportion of black. For the regions where the special color >0 and K=0, the standard transformation of the special color values into the process color space is carried out, whereas for the regions in which the special color and K>0 the method of the invention is used.

A further preferred development in this context is that if there are more regions with different special colors onto which at least one object may be printed in a print image, the second stage of the color space transformation into the process colors is carried out for every special color into the respective combination of process colors of the printing operation. It is possible that there are regions that include different special colors. In the rare cases in which a print image contains more than one special color, the method of the invention is carried out for every special color into the corresponding combination of process colors in accordance with the invention. In this context it is irrelevant whether one and the same object covers different special colors or whether there are different black objects to be printed onto different special color regions. In a case in which one and the same object is printed onto different regions of special colors, it goes without saying that a separation into two different image objects needs to be made: one image object formed of special color 1 plus the portion of the object printed thereon and the second image object formed of special color 2 plus the remaining portion of the black object printed thereon. The same applies in an analogous way if there are more than two special color regions.

An added preferred development in this context is that the at least one object is a line-shaped object, in particular a bar code, which is defined in the process colors by the combination CMY equaling zero and K at a maximum. The main field of application of the method of the invention is line-shaped black objects having a black value which is at the maximum and having remaining color proportions which are accordingly zero. In most cases, such objects are described in the CMYK color space, where CMY=0 and K=maximum. In this case, a first color space transformation of the corresponding black CMYK object into the XYZ/LAB color space is carried out in the course of the color transformation process in accordance with the printing operation and the transformation into the corresponding process color space is carried out in a second step in accordance with the invention. The latter is then usually the corresponding CMYK color space.

An additional preferred development in this context is that the maximum black value of the at least one object for the process color K is between 90 and 100. A maximum black value that is to be attained in the resultant CMYK print image in accordance with the method of the invention ranges between 90 and 100%.

A concomitant preferred development in this context is that the printing operation is an inkjet printing operation carried out by an inkjet printing machine. Although the method of the invention may in principle be used in lithographic offset printing, the preferred field of application is digital printing, in particular inkjet printing.

Other features which are considered as characteristic for the invention are set forth in the appended claims.

Although the invention is illustrated and described herein as embodied in a method for preserving the black composition of objects, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as such as well as further developments of the invention that are advantageous in structural and/or functional terms will be described in more detail below with reference to the associated drawings and based on at least one preferred exemplary embodiment.

DETAILED DESCRIPTION OF THE INVENTION

Figure 1:
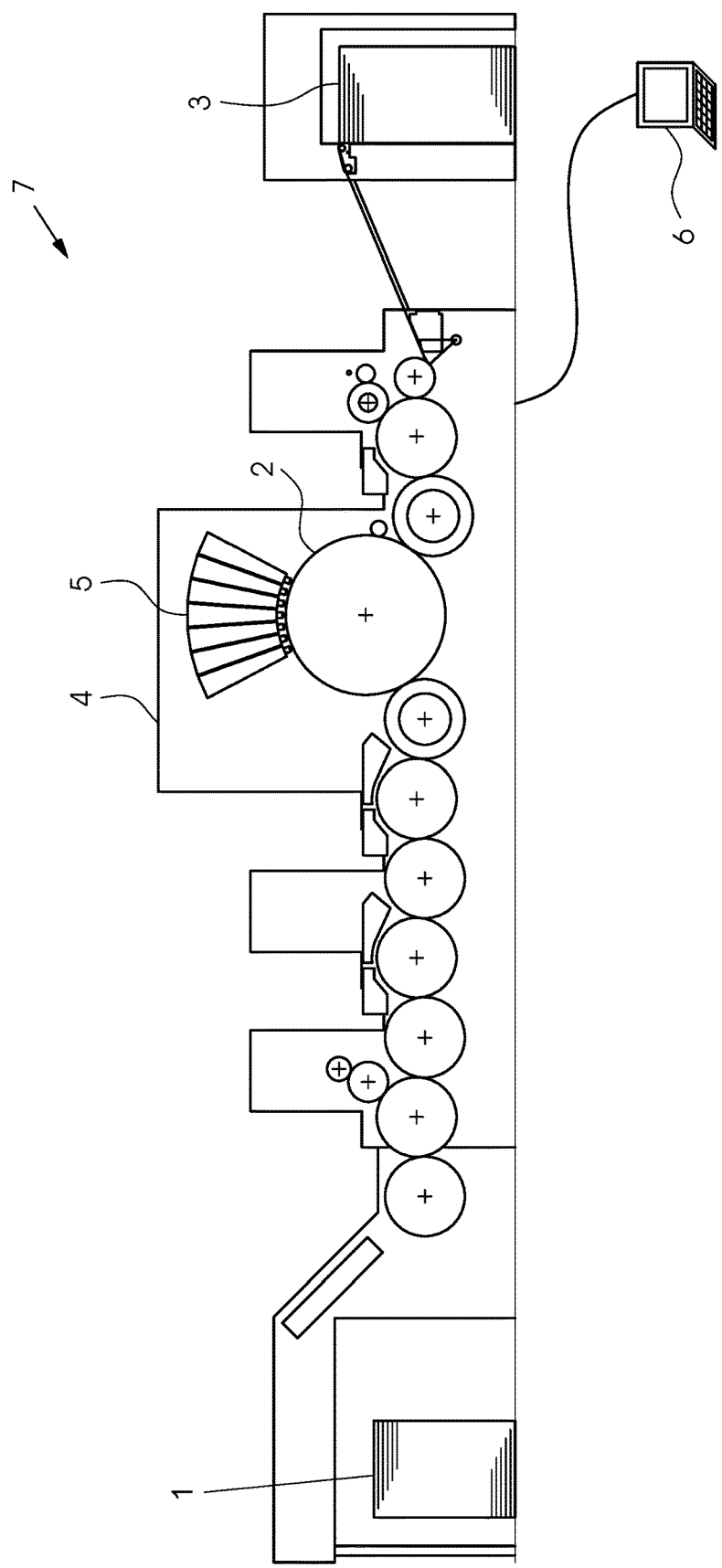
FIG. 1 is a diagrammatic, longitudinal-sectional view of an example of an inkjet printing machine.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. An example of the construction of such a printing machine 7 is shown in FIG. 1. A printing operation is monitored by a control unit or computer 6. A transfer cylinder transports a sheet or printing substrate 2 in a direction of transport from a feeder 1 to a printing unit 4 and to print heads 5, which are formed of one or more rows of printing nozzles. The cylinders are driven by one or more drives. The printing nozzles in the print heads 5 then apply ink to a sheet 2 to create the print image. The sheet 2 is transported onward, dried and transported further onward to a delivery 3 by the transfer cylinder.

Figure 3:
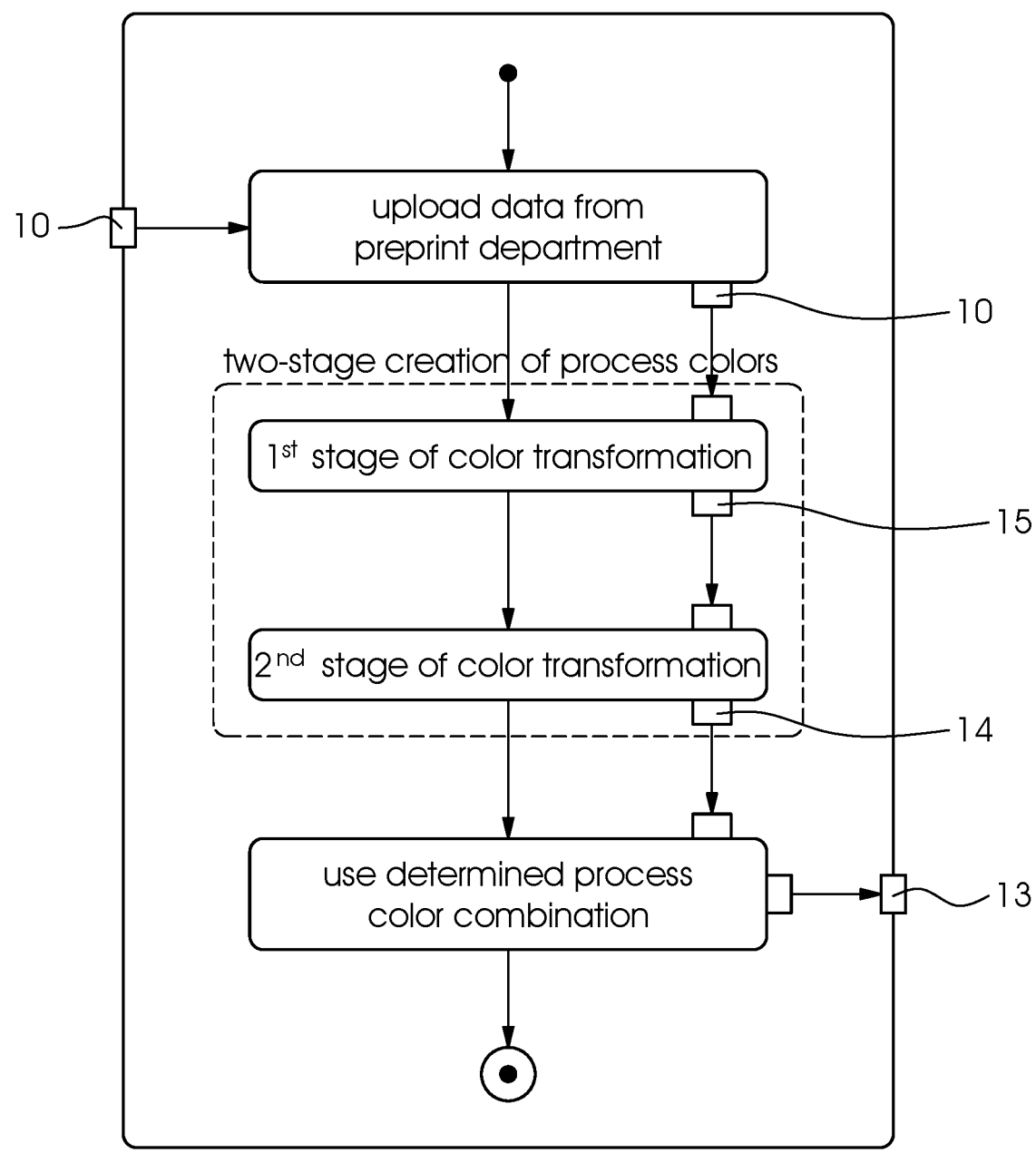
FIG. 3 is a schematic flow chart of the method of the invention.

The sequence of steps of the method of the invention is described in more detail on the basis of an example with regard to FIG. 3. The method is implemented by using the PDF print engine by Adobe, which runs on the computer 6. The PDF file to be processed is defined in the form of a bar code 8, namely as a CMYK object having the color values C=M=Y=0, K=100%, printed onto a special color of 100% Pantone 142 PC9, defined by the Lab values Lab: 78,6-13, 15-61,49.

Figure 2:
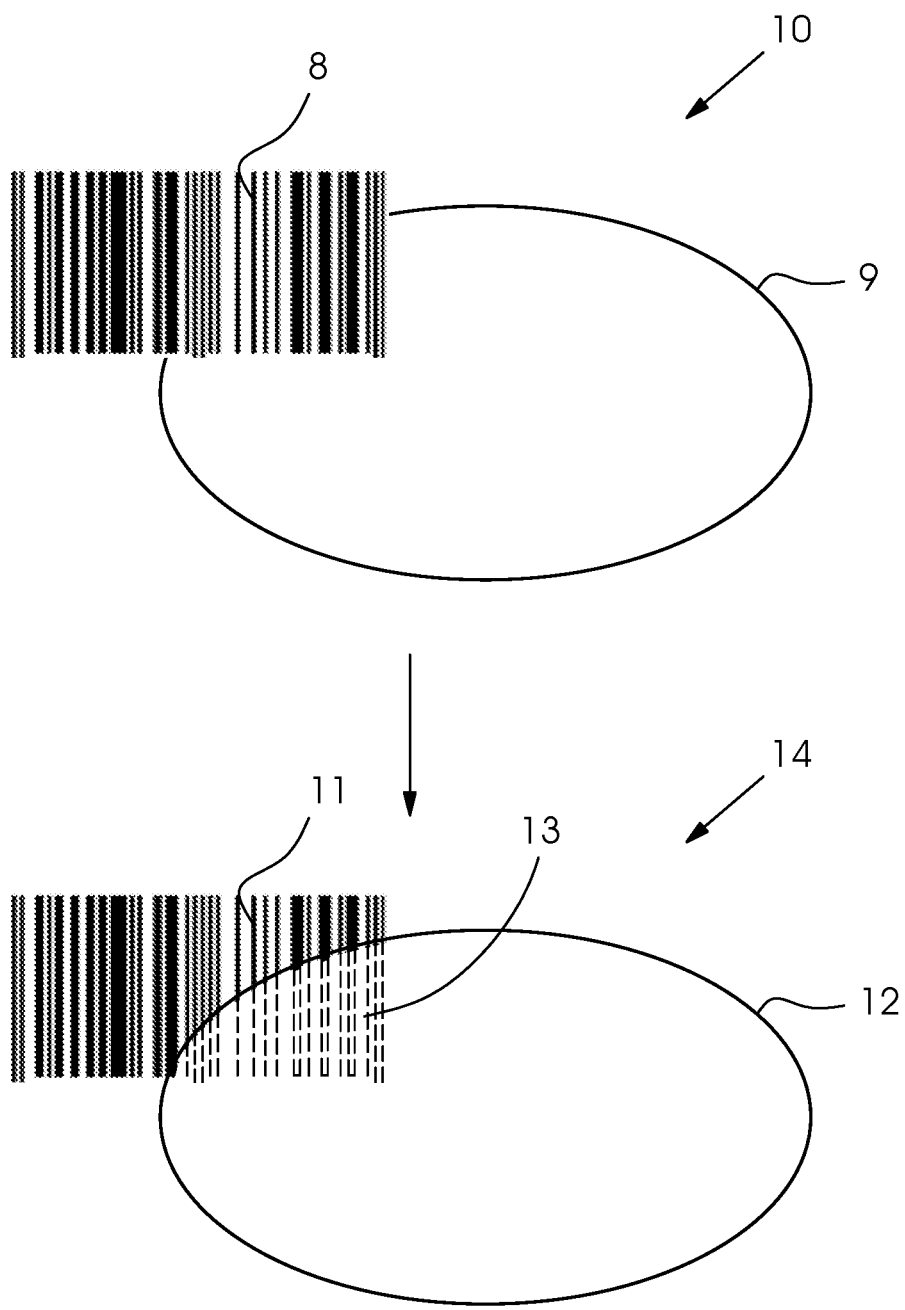
FIG. 2 is a graphical representation of a problematic situation in which a bar code is printed onto a special color.

In the illustrated exemplary embodiment, the inkjet printing machine 7 prints with six process colors CMYK plus the additional colors orange and green. As a result, there are two resultant objects 8, 9: firstly, the region of the Pantone 142 PC 9 special color and secondly the region in which the bar code 8 is to be printed onto the special color 9. This example is shown in the first part of FIG. 2.

In accordance with the conventional single-stage methods known from the prior art, the exemplary embodiment has the following sequence: Both objects 8, 9 are transformed into the XYZ color space, the mixed color is determined and transformed into the output color space by using the output profile. The result looks like this:

Pantone 142 PC 12: C=6, M=5, Y=63, G=0; O=21, K=0
Black on Pantone 142 PC 13: C=67, M=68, Y=83, G=2; O=17, K=85

It can be seen that in the overprint region of the special color 13 the black value of the bar code object 11 in the output color space is 85 and not a maximum value of approximately 100. This is shown in a corresponding way in the second part of the associated FIG. 2.

In accordance with the method of the invention, the image data 10 are transformed into the output color space in a first stage. Yet the regions with special colors 9 and the CMYK colors of the bar code 8 are not changed i.e. transformed. Thus, after the first color space transformation, one obtains a print image in the output color space 15 yet with the special color 9 regions and the region of the black object 8 placed on top of the special color still in the input color space.

In a second color management stage, Direct Color Adjustment is applied by using a PDF print engine interface. This means that in accordance with the invention, the values of the first color space transformation are adapted in terms of the remaining special color regions 8, 9 with and without bar code overprint. In the second stage, color management based on spectral color management, for instance, is implemented.

At the interface, one obtains the following values for the aforementioned exemplary embodiment:

Pantone 142 PC 9: Pantone 142 PC

Black on Pantone 142 9: Pantone 142 PC, K=100, C=M=Y=0

In this region with the two objects 8, 9, the computer 6 then identifies and separates the overprinted part of the bar code 8 based on the condition that C=M=Y=0 and K!=0. In the second stage, the region with the surfaces 9 that only are formed of Pantone 142 PC are transformed without changes into the output color space by using the output profile. For this region, one correspondingly obtains a region 12 in the process colors in the output color space.

For the overprinted bar code 13 region, the color space transformation is implemented in accordance with the invention as follows: The values are calculated with the spectral color management with a value K=0. Then the original K value is reintroduced into the result. The result is:

Pantone 142 PC 12→C=5, M=3, Y=60, G=0; O=33, K=0

Black on Pantone 142 13→C=5, M=3, Y=60, G=0; O=33, K=100

It can be seen that the resultant black value for K at the overprint section of the bar code is 100 at the maximum. An automated evaluation of the bar code 11 in a resultant print image 14 is thus possible without any problems.

The following is a summary list of reference numerals and the corresponding structure used in the above description of the invention:

1 feeder
2 printing substrate
3 delivery
4 inkjet printing unit
5 inkjet print head
6 computer
7 inkjet printing machine
8 black object "bar code" in the input color space
9 region of "Pantone 142 PC" special color in the input color space
10 preprint image in the input color space
11 black object "bar code" in the output color space
12 region of "Pantone 142 PC" special color in the output color space
13 region of black overprinting the special color in the output color space
14 process print image in the output color space
15 print image after the first color space transformation

The invention claimed is:

1. A method for preserving the black composition of at least one object positioned to overprint a special color in a print image for use in preprint color management of a printing operation by using a computer, the method comprising the following steps:

transforming the special color and the at least one object into a combination of process colors of the printing operation in a course of a color management process and then using the combination of process colors to generate the print image in a printing machine by:

providing the at least one object as a line-shaped object or a bar code being defined in the process colors by a combination of CMY equaling zero and K being at a maximum;

carrying out a color transformation into the process colors of the printing operation in first and second stages;

in the first stage, carrying out the color transformation into the process colors while keeping the special colors;

then checking whether an overprint of the at least one object onto the special color is present;

then removing a black proportion of the at least one object; and then, in a second stage, transforming the special color into the process colors and subsequently maximizing the black proportion of the at least one object.

2. The method according to claim 1, which further comprises carrying out a final maximization of the black proportion of the at least one object by overwriting the black proportion being created when the special color is transformed into the process colors with a maximum black value.

3. The method according to claim 1, which further comprises carrying out a final maximization of the black proportion of the at least one object by adding a maximum black value and not calculating a black proportion in the color transformation of the special color into the process colors.

4. The method according to claim 1, which further comprises including CMYK plus optionally at least one additional process color in the process colors of the printing operation defining an output color space of the printing operation.

5. The method according to claim 4, which further comprises carrying out the step of checking whether an overprint of the at least one object onto the special color is present by examining the color values of the at least one object with a condition that CMY are equal zero, K is at a maximum, and the special color is greater than zero.

6. The method according to claim 1, which further comprises converting regions of the print image having the special color and not being overprinted with the at least one object into the process colors in a course of the second color transformation stage without any influence on the proportion of black.

7. The method according to claim 1, which further comprises when more regions exist with different special colors onto which at least one object may be printed in a print image, carrying out the second stage of the color space transformation into the process colors for every special color in the respective combination of process colors of the printing operation.

8. The method according to claim 1, which further comprises selecting a maximum black value of the at least one object for a process color K to be between 90 and 100.

9. The method according to claim 1, which further comprises carrying out the printing operation as an inkjet printing operation on an inkjet printing machine.

\* \* \* \* \*